US007318226B2

(12) United States Patent
Chefalas et al.

(10) Patent No.: US 7,318,226 B2
(45) Date of Patent: Jan. 8, 2008

(54) DISTRIBUTED AUTONOMIC SOLUTIONS REPOSITORY

(75) Inventors: Thomas E. Chefalas, Somera, NY (US); Steven J. Mastrianni, Unionville, CT (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 10/687,176

(22) Filed: Oct. 16, 2003

(65) Prior Publication Data

US 2005/0086333 A1 Apr. 21, 2005

(51) Int. Cl.
*G06F 9/445* (2006.01)

(52) U.S. Cl. ...................... 717/171; 717/178; 717/101

(58) Field of Classification Search ........ 717/168-178, 717/101; 379/88.16, 88.18, 18, 218.01, 265.01, 379/265.11, 266.01; 370/356, 401; 455/414.3
See application file for complete search history.

(56) References Cited

U.S. PATENT DOCUMENTS

| | | | | |
|---|---|---|---|---|
| 5,634,114 | A * | 5/1997 | Shipley | 717/170 |
| 5,892,953 | A * | 4/1999 | Bhagria et al. | 717/175 |
| 5,945,988 | A * | 8/1999 | Williams et al. | 715/747 |
| 5,960,204 | A * | 9/1999 | Yinger et al. | 717/176 |
| 6,049,671 | A * | 4/2000 | Slivka et al. | 717/173 |
| 6,070,185 | A * | 5/2000 | Anupam et al. | 709/204 |
| 6,425,126 | B1 * | 7/2002 | Branson et al. | 717/168 |
| 6,501,995 | B1 * | 12/2002 | Kinney et al. | 700/1 |
| 6,611,498 | B1 * | 8/2003 | Baker et al. | 370/252 |
| 6,637,029 | B1 * | 10/2003 | Maissel et al. | 725/46 |
| 6,718,546 | B1 * | 4/2004 | Johnson | 717/169 |
| 6,782,495 | B2 * | 8/2004 | Bernklau-Halvor | 714/44 |
| 6,789,255 | B1 * | 9/2004 | Pedrizetti et al. | 717/169 |
| 6,826,534 | B1 * | 11/2004 | Gupta et al. | 705/1 |
| 6,948,164 | B2 * | 9/2005 | Tinker | 717/168 |
| 6,956,845 | B2 * | 10/2005 | Baker et al. | 370/352 |
| 6,968,550 | B2 * | 11/2005 | Branson et al. | 717/168 |
| 6,986,134 | B1 * | 1/2006 | Foster | 717/177 |
| 6,990,660 | B2 * | 1/2006 | Moshir et al. | 717/171 |
| 7,055,146 | B1 * | 5/2006 | Durr et al. | 717/162 |
| 7,073,172 | B2 * | 7/2006 | Chamberlain | 717/169 |
| 7,225,249 | B1 * | 5/2007 | Barry et al. | 709/227 |
| 7,236,486 | B2 * | 6/2007 | Baker et al. | 370/352 |

OTHER PUBLICATIONS

Deploying Distributed Business Software, Ted Lewis et al, Feb. 19, 1996, pp. 72-81.*

(Continued)

*Primary Examiner*—Todd Ingberg
(74) *Attorney, Agent, or Firm*—Duke W. Yee; Lisa M. Yamonaco; Lisa L. B. Yociss

(57) ABSTRACT

A method, apparatus, and computer instructions for managing software. A solution to a problem that has occurred with a program on a client data processing system is received by a server. This solution is created while solving the problem that occurred on the data processing system. The solution includes a process that may be executed on another data processing system to solve the same problem on that data processing system. The process is, for example, a script, a macro, or a set of computer executable steps or instructions. A database of solutions is selectively updated to reflect the new solution. In response to a request for a solution by another client system to a problem, the server will respond with the current solution that exists in the database.

17 Claims, 4 Drawing Sheets

START
700 DETECT BEGINNING OF DIAGNOSIS
702 RECORD STEPS IN DIAGNOSIS
704 DIAGNOSIS COMPLETE? NO / YES
706 PROBLEM IDENTIFIED? NO / YES
708 STORE RECORDED STEPS AND PROBLEM IDENTIFICATION
END

OTHER PUBLICATIONS

Problem Tracking Task Reference, Cintinuus/PT, Continuus Software Corporation, Change Management for Software Development, 1996, Whole Manual.*

McAfee Oil change User's Guide, Oil Change, Whole Manual, 1999.*

Consider Shifting From Automatic to Manual in Updating Programs, Staff, Houston Chronicle, Aug. 28, 1998, 2 pages.*

New Version of CyberMedia Oil change Updates Your PC Automatically—Even While You Sleep, PR Newswire, Jun. 17, 1997, 3 pages.*

Beginning Visual C++ 5, Ivor Horton, Mar. 19, 1997, pp. 715-734.*

Chefalas et al., Method and Apparatus for a Self Healing Agent, filed Oct. 16, 2003.

* cited by examiner

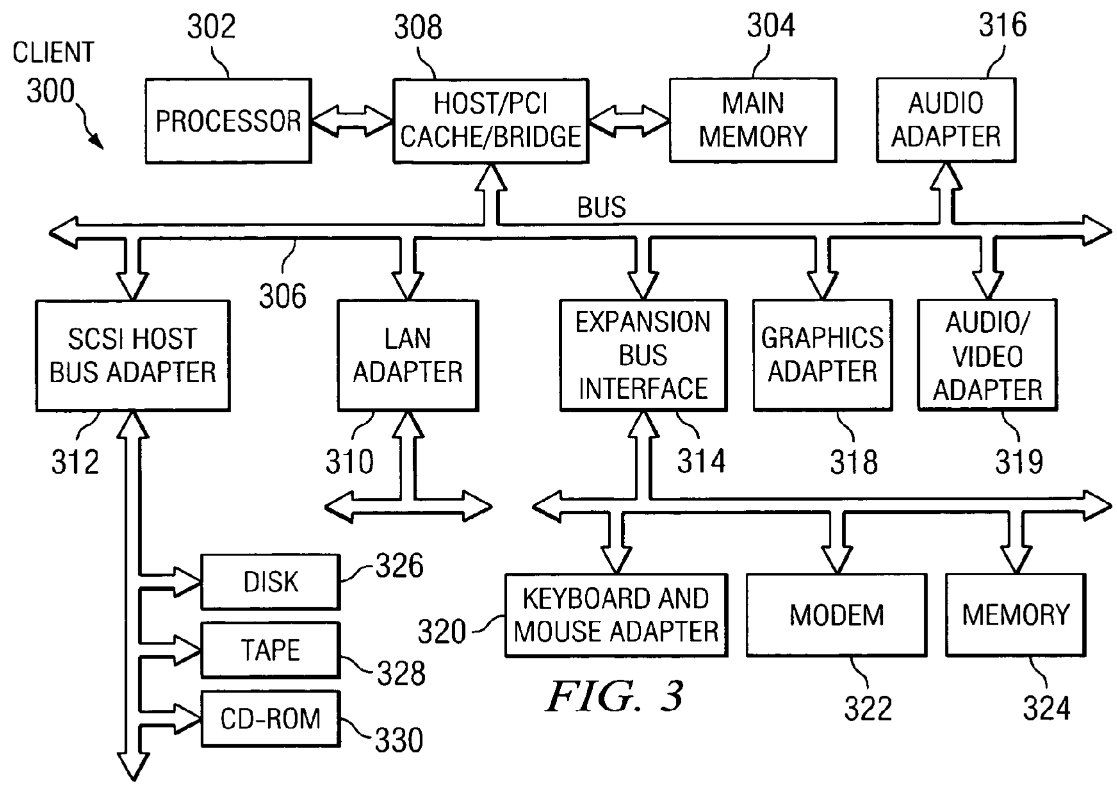
FIG. 3
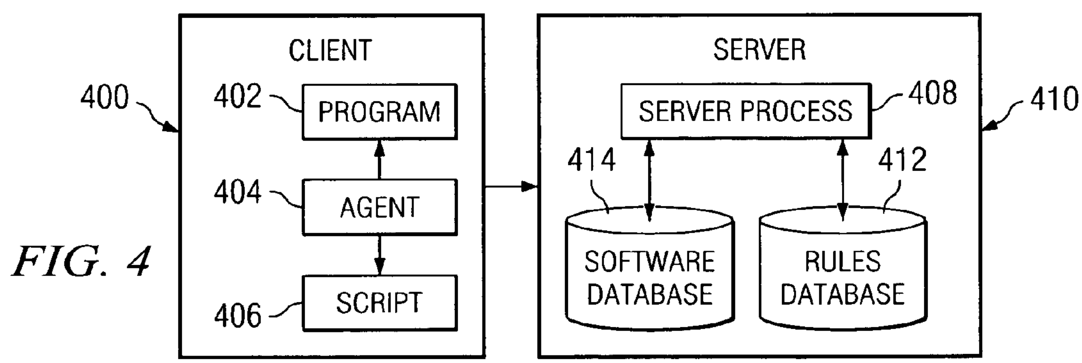
FIG. 4
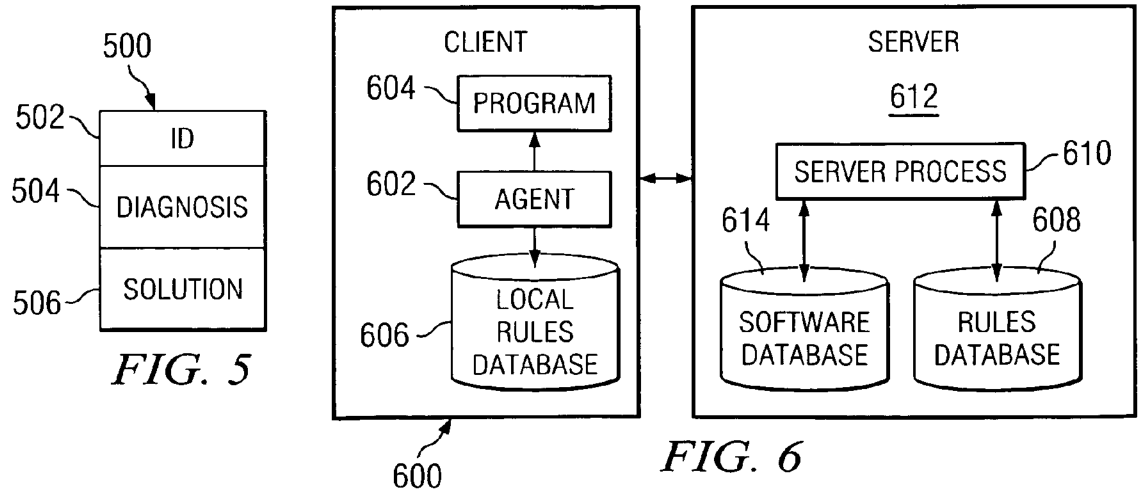
FIG. 5
FIG. 6

DISTRIBUTED AUTONOMIC SOLUTIONS REPOSITORY

CROSS REFERENCE TO RELATED APPLICATIONS

The present invention is related to an application entitled Method and Apparatus for a Self Healing Agent, Ser. No. 10687273, filed even date hereof, assigned to the same assignee, and incorporated herein by reference in entirety for all purposes.

BACKGROUND OF THE INVENTION

1. Technical Field

The present invention relates generally to an improved data processing system and in particular to a method and apparatus for managing software. Still more particularly, the present invention relates to a method, apparatus, and computer instructions for providing autonomic solutions for the repair and/or configuration of a stand-alone or network data processing system.

2. Description of Related Art

When a data processing system, such as a workstation or personal computer fails or breaks down, a system administrator or service engineer is tasked with finding the cause of the failure and providing a solution or fix to the failure. The system administrator or engineer uses their knowledge along with other materials and resources to diagnose the problem and repair the data processing system. The engineer may use various diagnostic software programs, as well as consult knowledge bases. The knowledge of what to change on the data processing system, how to make a change, and other information is usually found in a knowledge base. This knowledge base takes the form of bulletins, frequently asked questions (FAQs), tips, and techniques. However, the fix or solution to the problem is often the result of applying some or all of the recommended fixes in a manner that depends on the knowledge and experience of the administrator or engineer. This person combines the information and knowledge available to them and performs some set of steps to diagnose and provide a solution to the problem.

This knowledge is often never recorded or specified in a manner to allow others to use the information to diagnose and repair a similar problem, nor is the knowledge ever transferred to others who could benefit from the solution created by the administrator or engineer. In some cases, the engineer may post a solution or provide a frequently asked question (FAQ) entry on a Web site. Users of the Web site can attempt to locate a particular fix or solution by searching for the text of the symptoms. An example of this type of searchable database is the Microsoft Knowledge Base, which is available from Microsoft Corporation.

The knowledge may be obtained from this person by word of mouth if another administrator or engineer encounters a similar problem. Those who become experts in the field are continually called upon to perform a specific or specialized task with respect to solving problems with software. These problems may occur in many different situations. For example, problems may occur in a data processing system when adding a user, installing a program, or applying a patch. Further, problems also occur during the normal operation of the data processing system when a failure or error occurs.

In many cases, the user having a problem on a data processing system must wait for an expert or person with knowledge of the specific problem to come to their location and provide a solution to the problem. The system administrators and engineers often have numerous requests for aid and prioritize these requests based on their perceived severity of the problem. As a result, many users may become frustrated with waiting for a solution to a problem based on the demands and requests of the administrator or service engineer.

Therefore, it would be advantageous to have an improved method, apparatus, and computer instructions for managing such failures in a data processing system.

SUMMARY OF THE INVENTION

The present invention provides a method, apparatus, and computer instructions for managing software. A solution to a problem that has occurred with a program on a client data processing system is received by a server. This solution is created while solving the problem that occurred on the data processing system. The solution includes a process that may be executed on another data processing system to solve the same problem on that data processing system. The process is, for example, a script, a macro, or a set of computer executable steps or instructions. A database of solutions is selectively updated to reflect the new solution. In response to a request for a solution by another client system to a problem, the server will respond with the current solution that exists in the database.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a diagram illustrating components used in a distributed autonomic solutions repository with accordance with a preferred embodiment of the present invention;

FIG. 5 is a diagram illustrating an illustrative example of a solution in accordance with a preferred embodiment of the present invention;

FIG. 6 is a diagram illustrating a distribution of a solution from an autonomic knowledge base in accordance with a preferred embodiment of the present invention;

DETAILED DESCRIPTION OF THE PREFERRED EMBODIMENT

Figure 1:
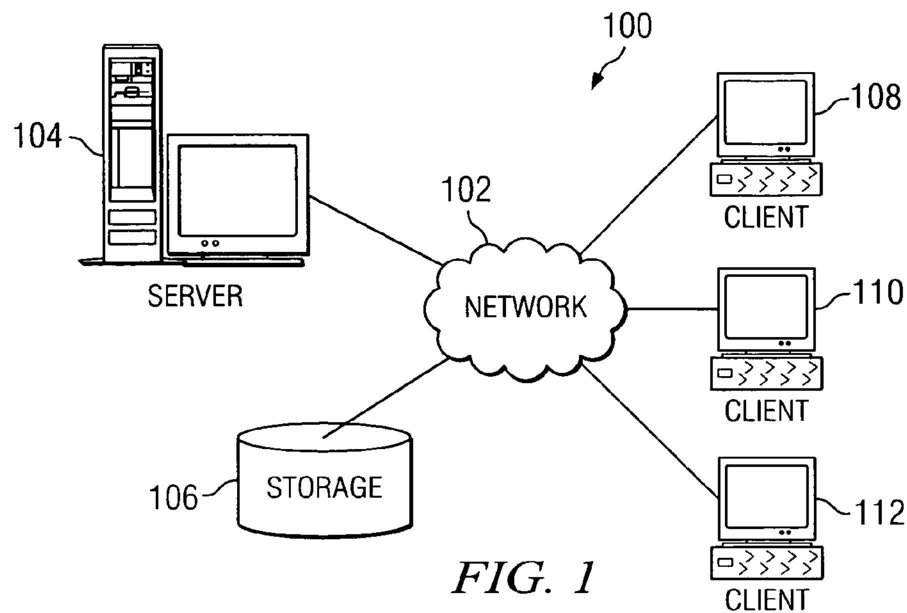
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks such as, for example, an intranet, a local area network (LAN), or a wide area network (WAN). FIG. 1 is intended as an example, and not as an architectural limitation for the present invention.

Figure 2:
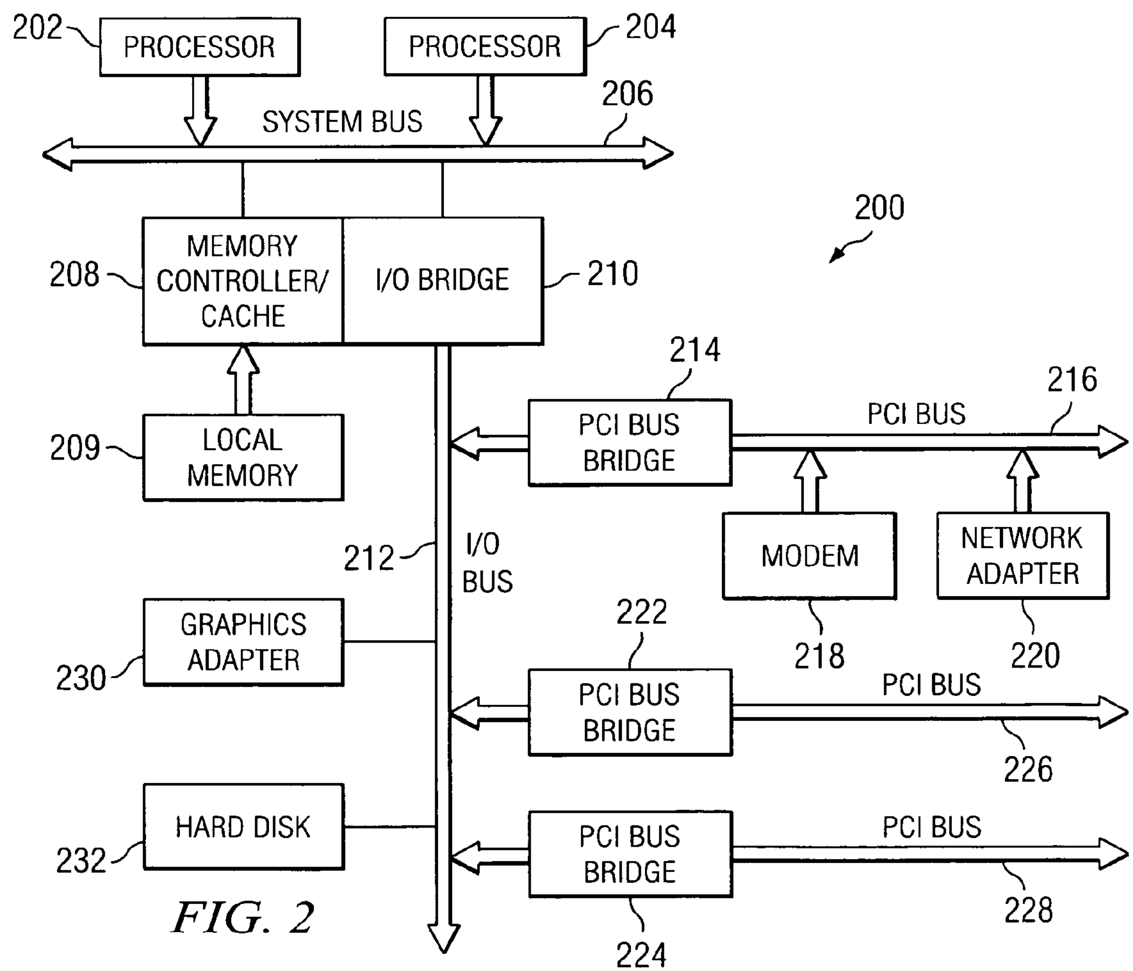
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for providing autonomic solutions in a network data processing system. The mechanism of the present invention stores solutions generated by users, such as engineers and administrators, in a repository that may be accessed to solve similar problems in various data processing systems in the network data processing system. The mechanism of the present invention provides for the use of a software process that records steps in diagnosing or identifying a software problem as well as a solution. These steps may be recorded in different ways, such as using a script.

Further, with respect to identifying or diagnosing a problem, the user may enter or indicate that the problem has been identified as well as indicate that a solution has been completed successfully. These steps are returned to a server process for addition to a knowledge base. In this manner, the steps may be played back or executed on another data processing system with a similar problem. Also, the mechanism of the present invention may analyze the steps recorded with respect to a current solution for the same problem. This analysis may determine whether steps to the current solution have changed. If the solution is changed, the current solution stored on the knowledge base may be updated with changes found in the new solution. This updating may take place automatically if a change is detected or on some statistical basis with respect to identifying solutions on different data processing systems for the same software problem with respect to the current solution. In this manner, steps in a current solution that may have become invalid may be removed from the knowledge base. This knowledge base is a dynamic and changing database that reflects the current solutions for different problems. In this manner, rules, or steps formed in previous operations for a solution may be modified based on more recent solutions or findings. The application of these rules may be determined by a policy, which is determined and set by the user or the user's information technology (IT) organization.

Turning now to FIG. 4, a diagram illustrating components used in a distributed autonomic solutions repository is depicted in accordance with a preferred embodiment of the present invention. In this illustrative example, client 400 includes software program 402, which has a problem or has caused an error. Client 400 may be, for example, data processing system 300 in FIG. 3. Agent 404 is initiated when a user, such as an administrator or service engineer, analyzes client 400 to identify the problem. The particular problem identified may be associated with some unique identifier assigned for this particular problem. The steps used in diagnosing the problem, as well as the identification of the problem itself, may be stored in script 406 by agent 404. The particular steps are automatically recorded in script 406 without requiring the user to take any active steps beyond initiating agent 404. After the problem is identified, the user may indicate to agent 404 that the problem has been successfully diagnosed. At this point, the user may then take steps to generate a solution to the problem with program 402. These steps also are recorded by agent 404 in script 406. In another implementation of the present invention, agent 404 is started when client 400 is started, and thus continually monitors the system. In this case, the user is not specifically required to initiate the agent as described previously.

In this example, the problem may be a printing problem involving printing of a document or file to a color printer. The user may determine that a particular patch for program 402 is an incorrect patch, or that the printer driver software is configured incorrectly, or the printer driver software is an obsolete or incompatible version. The different steps used in making this diagnosis may include, for example, testing the program with the patch and without the patch with respect to the errors that are generated by program 402, or by updating or replacing the printer driver software or color table. If the user determines that the patch is a bad patch, then the particular errors caused by program 402 and the steps used to diagnose and repair the problem may be stored in script 406. Thereafter, the user initiates a solution or steps to repair program 402. In this example, program 402 may require a different patch or a different sequence of patches. The steps in repairing program 402 are also recorded in script 406.

When the repair is completed, the user may indicate that the repair was successful. In response to a successful result, agent 404 automatically sends script 406 to server process 408 in server 410. Server process 408 in server 410 receives script 406 and stores the script in rules database 412. In this illustrative embodiment, server 410 may be implemented using data processing system 200 in FIG. 2. This server also includes software database 414, which, in these examples, includes the various components needed for solutions. For example, software database 414 may contain patches, replacement dynamic link libraries, replacement executable modules, and configuration parameters. A determination is made as to whether the problem identified for program 402 already has a solution within rules database 412. If a similar solution is present, a comparison is made between the new solution received from agent 404 and the current solution stored in rules database 412. If the solution is different, the current solution may be updated with the new solution. This update may be made after a administrator is notified of the change in steps used to reach the solution for the problem. If the administrator approves of the update, the new solution is used to update the current solution in rules database 412. Additionally, a statistical analysis may be made to determine whether the new solution received from agent 404 is statistically significant to warrant a change in the current solution. This analysis may be made by tracking the problems encountered and solutions received from different clients within the network data processing system to identify how often particular steps have changed with respect to the current solution stored in rules database 412. If the change is identified as one that is significant enough to warrant an update, then the update is made in rules database 412. In this manner, steps that become obsolete or fail to solve the problem may be removed while additional steps needed to solve the particular problem may be added to the solution in rules database 412 for this particular problem.

For example, if the solution to a printing problem such as the problem described above requires the installation of a new printer driver, the new printer driver is installed. If the server begins to receive a large number of previously unreported problems from client systems subsequent to the installation of the new printer driver, the rules engine may determine that the problem is likely caused by the new printer driver. In this case, the server will send to agent 404 the instructions to roll back the printer driver to the previous version. The server will then continue to monitor client 400 to determine if the new error reports diminish or disappear. If so, the server determines that the new printer driver is the reason for the problems and removes the new printer driver as a solution script until a determination can be made as to how to fix the original problem. As soon as the proper determination is made, the solution script is updated to reflect the new solution.

Alternatively, agent 404 may monitor system changes and record those changes rather than recording particular steps taken by a user in fixing the problem. Once the problem has been identified and a solution for the problem has been implemented, the user may indicate to agent 404 that the solution is complete. Agent 404 then identifies all changes made within client 400. These changes may include patches that have been added to program 402, changes in configuration parameters, removal of patches, and other changes to program 402, or to other components within client 400. At that time, agent 404 may send this solution to server process 408 for processing and updating the repository contained within server 410.

Turning now to FIG. 5, a diagram illustrating an illustrative example of a solution is depicted in accordance with a preferred embodiment of the present invention. Solution 500 is an example of a solution recorded by client 400 in FIG. 4. This solution may take the form of scripts, such as script 406 in FIG. 4. In this example, solution 500 contains identifier 502, diagnosis 504, and solution 506. Identifier 502 is a unique identifier used to identify the problem that is being diagnosed and solved. This identifier is used to determine whether a solution is already present in a knowledge base for the particular problem. Solution 500 also includes diagnosis 504 and solution 506. In these examples, diagnosis 504 and solution 506 may take the form of steps recorded while a user is diagnosing and repairing a problem for a client.

Additionally, solution 506 also may take the form or state information identifying changes made in the client to solve the problem. These changes may include, for example, the addition of a patch, or change in configuration parameters in the program or operating system. Additionally, solution 506 may also include the prerequisite or subsequent execution of another solution or solutions, identified by their ID. These solutions may also refer to the prerequisite or subsequent execution of another solution or solutions, thus establishing a relationship and dependency between the solutions.

Turning now to FIG. 6, a diagram illustrating a distribution of a solution from an autonomic knowledge base is depicted in accordance with a preferred embodiment of the present invention. Client 600 contains agent 602 and program 604, and local rules database 606. Agent 602 may be used to monitor program 604 to determine where the failure or error occurs. Agent 602 accesses local rules database 606 in the event that an error occurs. This local rules database may be used to identify a particular problem as well as identify solutions for that problem. Local rules database 606 is updated using rules database 608. This update occurs through server process 610 on server 612. In particular, local rules database 606 may take the form of a copy of rules database 608. When a particular solution is identified for a problem in a program, such as program 604, local rules database 606 may identify various components that are needed to solve the problem. These components may be obtained from software database 614. As described above, this database may include components, such as patches, efixes, dynamic link libraries, and executable modules. In these examples, server process 610 may push updates to agent 602 to update local rules database 606. Further, server process 610 may subscribe to other published knowledge bases and incorporated new procedures and fixes from those systems. In this manner, the knowledge base in rules database 608 may be aggregated and updated as necessary.

The different procedures and identification of problems and solutions are stored in rules database 608, while the different components needed to implement a solution may be stored in software database 614. For example, software database 614 may include executable files, dynamic link libraries, and patches. Depending on the particular implementation, the procedures and the components may be located in the same database or further subdivided and placed into other databases.

In this manner, the mechanism of the present invention provides more than merely a recording facility for steps. This mechanism learns from steps taken by a user identifying and solving a problem by comparing the steps in the solution with changes from currently stored steps for a particular problem to update that solution in the knowledge base. In this manner, the mechanism of the present invention adjusts, extends, and/or augments, in a closed-loop fashion, the knowledge base so that the application of the solutions may be applied to other data processing systems when the same or similar problems are encountered.

For example, if a step calls for an installation of a particular version of a dynamic link library and a later step requires the dynamic link library to be upgraded, the steps may be combined into a single step in which the new upgraded dynamic link library is installed early in the process if possible. If this solution causes problems at a later time, appropriate changes may be made such as generating a solution that removes the new dynamic link library and reinstalls the previous version or an older version.

Further, the mechanism of the present invention gathers statistics on selected operations. An operation, such as upgrading a database for a set of files causes problems at a later point and time, that upgrade may be marked as a trouble spot and sent to the system administrator to decide on whether a change to the solution is needed. The results of this decision may be used to upgrade the current knowledge base. As a result, if the findings require removal of a previously installed patch or program, this operation may be pushed to the client from the server and follow up operations performed on the client if necessary by an agent process.

Figure 7:
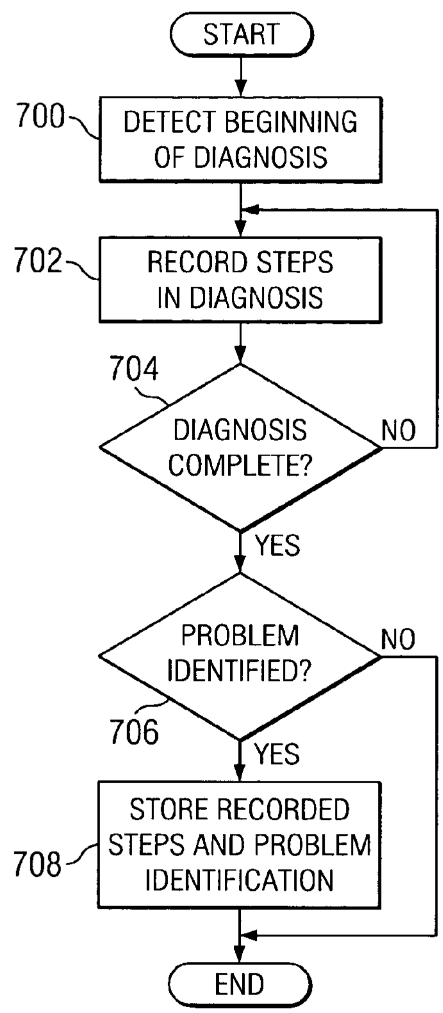
FIG. 7 is a flowchart of a process for identifying a diagnosis for a problem in accordance with a preferred embodiment of the present invention.

Turning now to FIG. 7, a flowchart of a process for identifying a diagnosis for a problem is depicted in accordance with a preferred embodiment of the present invention. The process illustrated in FIG. 7 may be implemented in an agent, such as agent 404 in FIG. 4.

The process begins by detecting the beginning of a diagnosis of a problem (step 700). This step may be initiated by a user, at the client, entering the user input indicating that the diagnosis procedure is beginning. Next, steps in the diagnosis are recorded (step 702). These steps may include, for example, diagnosis programs executed by the user, parameter or configuration information examined by the user, in other operations or steps performed by the user. Next, a determination is made as to whether the diagnosis is complete (step 704). If the diagnosis is not complete, the process returns to step 702. Otherwise, a determination is made as to whether the problem has been identified by the user (step 706). The user may indicate that the problem has been identified through a selected user input to the agent.

If the problem has been identified, the recorded steps and the problem identification are stored (step 708) with the process terminating thereafter. If the problem has not been successfully identified, the process terminates without storing the recorded information. After this portion of the process is completed, the user then initiates a solution or repair process.

Figure 8:
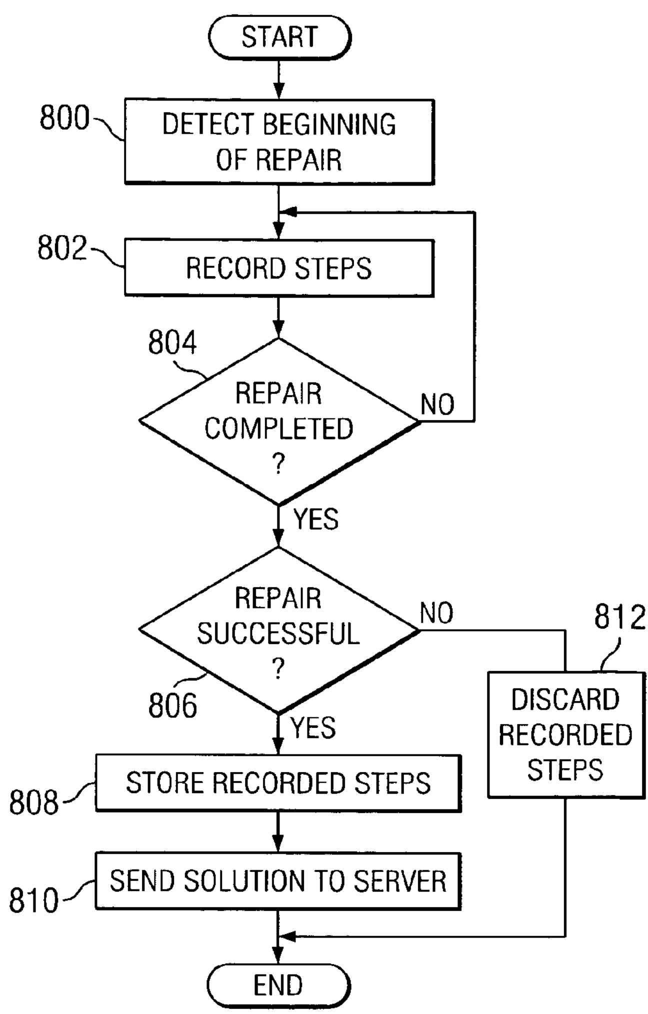
FIG. 8 is a flowchart of a solution or repair process in accordance with a preferred embodiment of the present invention.

Turning now to FIG. 8, a flowchart of a solution or repair process is depicted in accordance with a preferred embodiment of the present invention. The process illustrated in FIG. 8 may be implemented in an agent, such as agent 404 in FIG. 4.

The process begins by detecting the beginning of the repair (step 800). This step detects a selected user input indicating that steps are now being taken to repair or solve the problem. These steps are recorded (step 802). Thereafter, a determination is made as to whether the repair has been successfully completed (step 804). If the repair has not been completed, the process returns to step 802. Otherwise, a determination is made as to whether the repair has been successful (step 806). The user provides an input to indicate whether the repair is successful in this particular case in response to a prompt from the agent process. If the repair is successful, these steps are stored with the recorded steps and the problem identification to form a solution (step 808). Thereafter, the solution is sent to the server (step 810) with the process terminating thereafter.

With reference again to step 806, if the repair is not successful, the recorded steps for the diagnosis and solution are discarded (step 812) with the process terminating thereafter.

Figure 9:
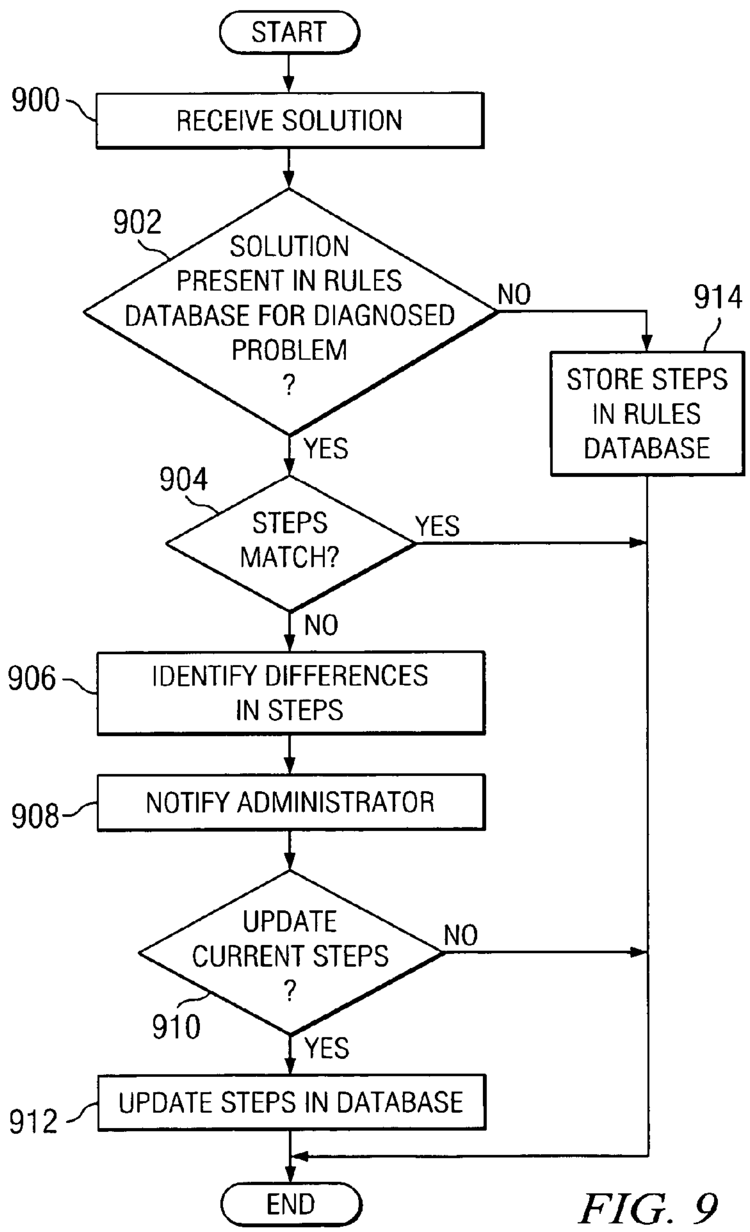
FIG. 9 is a flowchart of a process for handling a solution received from an agent in accordance with a preferred embodiment of the present invention.

Turning now to FIG. 9, a flowchart of a process for handling a solution received from an agent is depicted in accordance with a preferred embodiment of the present invention. The process illustrated in FIG. 9 may be implemented in a process, such as server process 408 in FIG. 4.

The process begins by receiving a solution from an agent (step 900). A determination is made as to whether the recorded steps in the solution are present in the rules database for the diagnosed problem (step 902). This determination is made by searching for the problem identification in the rules database. In these examples, the problem identification is a unique identifier for a particular problem. If the recorded steps are found in the rules database, a determination is made as to whether the steps taken to solve the problem in the received solution matched those in the rules database (step 904).

If a match does not occur, differences in the steps are identified (step 906). A notification is then sent to the administrator (step 908). This particular example allows the administrator to determine whether an update should occur. A determination is made as to whether to update the current steps (step 910). If an update is to occur, the steps in the rules database are updated with the new steps in the received solution (step 912) with the process terminating thereafter. This update may include eliminating steps from the current solution as well as adding new steps.

With reference again to step 910, if the current steps are not to be updated, the process terminates without making changes to the rules database. Turning back to step 904, if a match does occur, then the steps in the solution are identical to those in the rules database and no updates are made. In this case, the process terminates. With reference back to step 902, if the solution is not present in the rules database for the diagnosed problem, the steps in the solution are stored in the rules database for this particular problem (step 914) with the process terminating thereafter.

Figure 10:
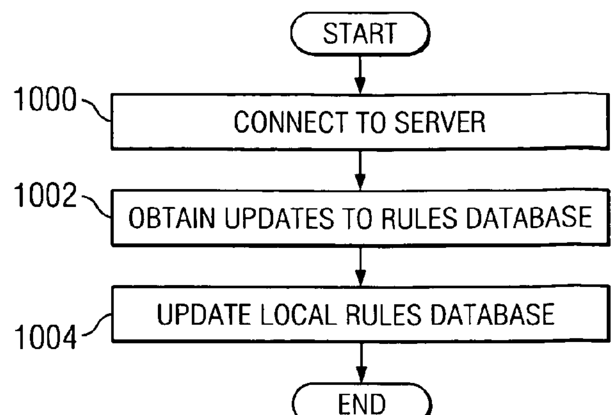
FIG. 10 is a flowchart of a process for updating a local rules database in accordance with a preferred embodiment of the present invention.

With reference now to FIG. 10, a flowchart of a process for updating a local rules database is depicted in accordance with a preferred embodiment of the present invention. The process illustrated in FIG. 10 may be implemented in an agent, such as agent 404 in FIG. 4. The process begins by connecting to the server (step 1000). Next, updates to the rules database are obtained (step 1002). These updates are then used to update a local rules database (step 1004) with the process terminating thereafter.

Figure 11:
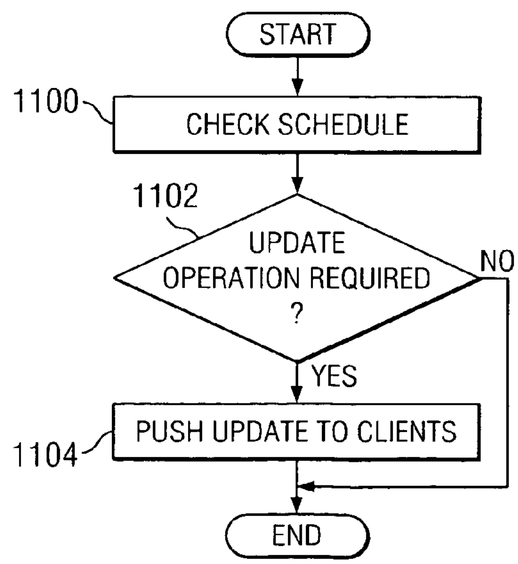
FIG. 11 is a flowchart of a process for sending updates in a knowledge base to an agent in accordance with a preferred embodiment of the present invention.

Turning to FIG. 11, a flowchart of a process for sending updates in a knowledge base to an agent is depicted in accordance with a preferred embodiment of the present invention. The process illustrated in FIG. 11 may be implemented in a server process, such as server process 610 in FIG. 6. The process begins by checking a schedule (step 1100). The schedule identifies when updates to the knowledge should be sent to clients. A determination is made as to whether an update operation is required (step 1102). If an update operation is required, the update is then pushed or sent to clients of the server process (step 1104) with the process terminating thereafter. If an update is not required, the process terminates without taking any action.

Thus, the present invention provides an improved method, apparatus, and computer instructions for a distributed autonomic solutions repository. In these examples, rules database 412 in FIG. 4 and rules database 608 in FIG. 6 are knowledge bases of solutions to problems that may be encountered by clients. The mechanism of the present invention builds and updates this knowledge base through solutions received from users performing repairs or maintenance procedures on clients. The steps performed by these users are recorded and returned to the knowledge database. New solutions to problems not present in this knowledge database are added to the database. Additionally, if new solutions are received for problems currently having solutions in the knowledge base, a determination is made as to whether an update to the current solution is to be made. This decision with respect to the update may be made by an administrator or other user. Alternatively, updates may be automatically made based on a statistical analysis of the solutions received from agents with respect to current solutions.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer programs in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method in a data processing system for managing software, the method comprising:

identifying that a problem has occurred in a program that is in the client computer system;

responsive to identifying the problem, initiating, by a user of the client computer system, an agent that executes within the client computer system;

associating a problem identifier with the problem;

taking diagnostic steps, by the user, to diagnose the problem;

automatically recording, by the agent into a script in the client computer system, the diagnostic steps as the diagnostic steps are taken by the user, the user not taking any action to have the diagnostic steps recorded;

storing the problem identifier in the script;

indicating, by the user to the agent, that the problem has been diagnosed;

taking correction steps, by the user, to fix the problem;

automatically recording, by the agent into the script, the correction steps as the correction steps are taken by the user, the user not taking any action to have the correction steps recorded;

providing, by the user to the agent, an input to indicate whether the correction steps corrected the problem;

responsive to the correction steps correcting the problem;

automatically sending, by the agent, a solution to a server computer system, the solution including the correction steps and the problem identifier;

responsive to the server computer system receiving the solution, searching, by the server computer system, a rules database that is included in the server computer system for a stored solution that includes the problem identifier;

in response to locating the stored solution in the rules database in the server computer system, determining whether the stored solution includes stored correction steps that are the same as said correction steps;

in response to the stored correction steps being different from the correction steps, identifying differences between the stored correction steps and the correction steps, and notifying a server computer system administrator about the differences; and responsive to the administrator approving an update, updating the stored solution to include said correction steps to form a second stored solution.

2. The method of claim 1, further comprising:

said correction steps that are taken to fix the problem including:

identifying a patch that is necessary in order to fix the problem; and obtaining, by the client computer system from a software database that is included in the server computer system, the patch.

3. The method of claim 1, further comprising:

connecting, by a second agent in a second client computer system, to said server computer system;

obtaining, by said second agent, updates to a rules database, which is included in said second client computer system;

said updates including said second stored solution;

in response to an occurrence of said problem in said second client computer system, using said second stored solution from said rules database in said second client computer system to fix said problem in said second client computer system.

4. The method of claim 1, further comprising:

updating the stored solution to form a second stored solution by removing steps from said stored correction steps and adding steps to said stored solution steps.

5. The method of claim 1, wherein the correction steps include at least one of changing configuration parameters, replacing a dynamic link library, replacing an executable file, and installing a patch.

6. The method of claim 1, further comprising:

in response to not locating a stored solution in the rules database in the server computer system that includes the problem identifier, saving the solution in the rules database in the server computer system.

7. A data processing system for managing software, the data processing system comprising:

identifying means for identifying that a problem has occurred in a program that is in the client computer system;

responsive to identifying the problem, initiating means for initiating, by a user of the client computer system, an agent that executes within the client computer system;

a problem identifier that is associated with the problem;

diagnostic steps, taken by the user, to diagnose the problem;

the agent in the client computer system automatically recording the diagnostic steps into a script in the client database as the diagnostic steps are taken by the user, the user not taking any action to have the diagnostic steps recorded;

the script for storing the problem identifier;

indicating means for initiating, by the user to the agent, that the problem has been diagnosed;

correction steps, taken by the user, to fix the problem;

the agent automatically recording the correction steps into the script as the correction steps are taken by the user, the user not taking any action to have the correction steps recorded;

providing means for providing, by the user to the agent, an input to indicate whether the correction steps corrected the problem;

responsive to the correction steps correcting the problem;

the agent automatically sending a solution to a server computer system, the solution including the correction steps and the problem identifier;

responsive to the server computer system receiving the solution, the server computer system searching a rules database that is included in the server computer system for a stored solution that includes the problem identifier;

in response to locating the stored solution in the rules database in the server computer system, determining means for determining whether the stored solution includes stored correction steps that are the same as said correction steps;

in response to the stored correction steps being different from the correction steps, identifying means for identifying differences between the stored correction steps and the correction steps, and notifying means for notifying a server computer system administrator about the differences; and responsive to the administrator approving an update, updating means for updating the stored solution to include said correction steps to form a second stored solution.

8. The data processing system of claim 7, further comprising:

said correction steps that are taken to fix the problem including;

identifying means for identifying a patch that is necessary in order to fix the problem; and the client computer system obtaining, from a software database that is included in the server computer system, the patch.

9. The data processing system of claim 7, further comprising:

in response to not locating a stored solution in the rules database in the server computer system that includes the problem identifier, saving means for saving the solution in the rules database in the server computer system.

10. The data processing system of claim 7, further comprising:

a second agent in a second client computer system connecting to said server computer system;

said second agent obtaining updates to a rules database, which is included in said second client computer system;

said updates including said second stored solution;

in response to an occurrence of said problem in said second client computer system, using means for using said second stored solution from said rules database in said second client computer system to fix said problem in said second client computer system.

11. The data processing system of claim 7, wherein the correction steps include at least one of changing configuration parameters, replacing a dynamic link library, replacing an executable file, and installing a patch.

12. A computer program product that is stored in a computer readable medium for managing software, the computer program product comprising:

instructions for identifying that a problem has occurred in a program that is in the client computer system;

responsive to identifying the problem, instructions for initiating, by a user of the client computer system, an agent that executes within the client computer system;

instructions for associating a problem identifier with the problem;

instructions for taking diagnostic steps, by the user, to diagnose the problem;

instructions for automatically recording, by the agent into a script in the client computer system, the diagnostic steps as the diagnostic steps are taken by the user, the user not taking any action to have the diagnostic steps recorded;

instructions for storing the problem identifier in the script;

instructions for indicating, by the user to the agent, that the problem has been diagnosed;

instructions for taking correction steps, by the user, to fix the problem;

instructions for automatically recording, by the agent into the script, the correction steps as the correction steps are taken by the user, the user not taking any action to have the correction steps recorded;

instructions for providing, by the user to the agent, an input to indicate whether the correction steps corrected the problem;

responsive to the correction steps correcting the problem;

instructions for automatically sending, by the agent, a solution to a server computer system, the solution including the correction steps and the problem identifier;

responsive to the server computer system receiving the solution, instructions for searching, by the server computer system, a rules database that is included in the server computer system for a stored solution that includes the problem identifier;

in response to locating the stored solution in the rules database in the server computer system, instructions for determining whether the stored solution includes stored correction steps that are the same as said correction steps;

in response to the stored correction steps being different from the correction steps, instructions for identifying differences between the stored correction steps and the correction steps, and instructions for notifying a server computer system administrator about the differences; and responsive to the administrator approving an update, instructions for updating the stored solution to include said correction steps to form a second stored solution.

13. The computer program product of claim 12, further comprising:

said correction steps that are taken to fix the problem including:

instructions for identifying a patch that is necessary in order to fix the problem; and instructions for obtaining, by the client computer system from a software database that is included in the server computer system, the patch.

14. The computer program product of claim 12, further comprising:

instructions for connecting, by a second agent in a second client computer system, to said server computer system;

instructions for obtaining, by said second agent, updates to a rules database, which is included in said second client computer system;

said updates that including said second stored solution;

in response to an occurrence of said problem in said second client computer system, instructions for using said second stored solution from said rules database in said second client computer system to fix said problem in said second client computer system.

15. The computer program product of claim 12, further comprising:

instructions for updating the stored solution to form a second stored solution by removing steps from said stored correction steps and adding steps to said stored solution steps.

16. The computer program product of claim 12, wherein the correction steps include at least one of changing configuration parameters, replacing a dynamic link library, replacing an executable file, and installing a patch.

17. The computer program product of claim 12, further comprising:

in response to not locating a stored solution in the rules database in the server computer system that includes the problem identifier, instructions for saving the solution in the rules database in the server computer system.

* * * * *